Dec. 1, 1931.  R. BIRRELL  1,834,235
OPERATING MEANS FOR WINDOWS
Filed Aug. 26, 1930
Fig. 1.
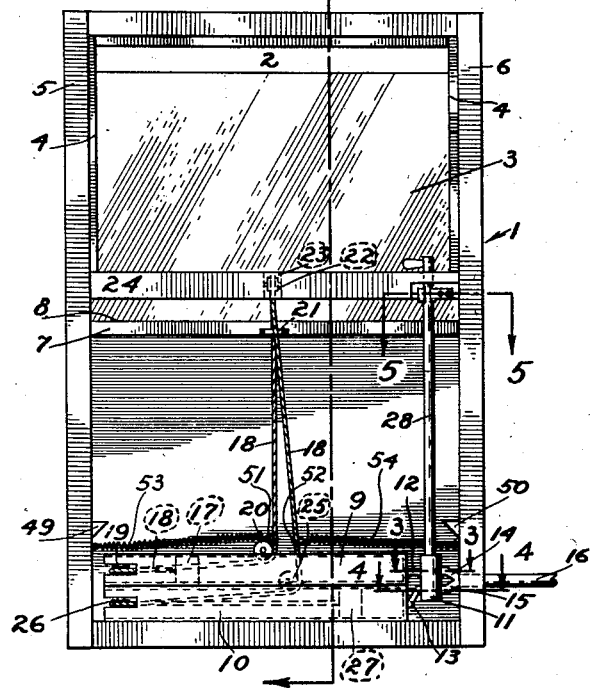
Fig. 2.
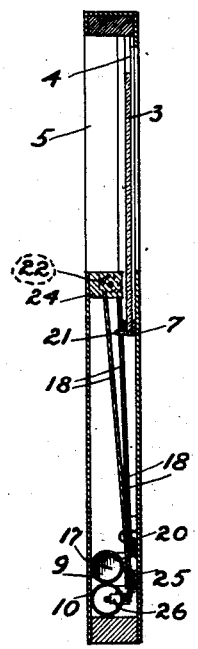
Fig. 3.
Fig. 5.
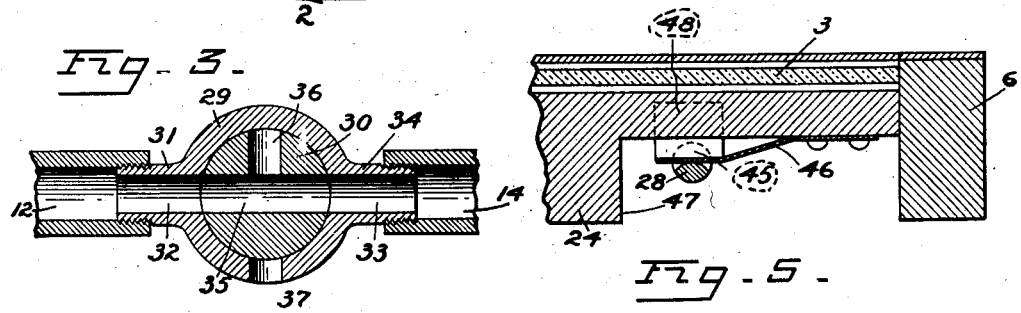
Fig. 4.
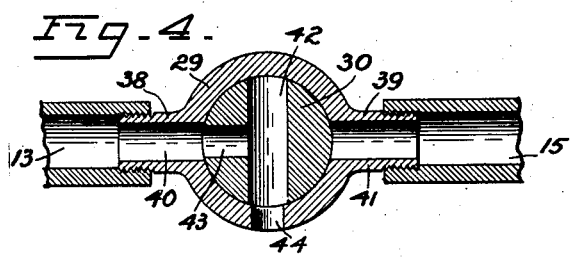
INVENTOR.
ROYDEN BIRRELL
BY Munn & Co.
ATTORNEYS.

Patented Dec. 1, 1931

1,834,235

UNITED STATES PATENT OFFICE

ROYDEN BIRRELL, OF SACRAMENTO, CALIFORNIA

OPERATING MEANS FOR WINDOWS

Application filed August 26, 1930. Serial No. 477,877.

My invention relates to improvements in operating means for windows, and it consists in the combinations, constructions and arrangements hereinafter described and claimed.

An object of my invention is to provide a device for conveniently raising or lowering windows operated by vacuum. While my invention is not limited to any particular use, it is particularly designed for raising and lowering windows in closed automobiles, and the various parts are so arranged as to be concealed within the automobile door.

My invention is illustrated in the accompanying drawings forming a part of this application, in which:

Figure 1 is an elevation of an automobile door as seen from the interior with a portion thereof removed for clarity, and Figures 2 to 5 inclusive are sections taken along their respective lines of Figure 1.

In carrying out my invention, I make use of an automobile door generally indicated at 1 and having a window opening 2 therein.
A transparent member 3 is adapted to reciprocate in side guides or channels 4 which are formed in the vertical side walls 5 and 6 of the window opening 2. The member 3 is provided with a channel-shaped strip 7 extending along an edge 8 thereof.

In the lower part of the door 1, I dispose two cylinders 9 and 10 connected with a valve 11 by means of two tubes 12 and 13 respectively. Two other tubes 14 and 15 extend from the valve 11 and connect with a flexible tube 16, which in turn is connected with an intake manifold of an automobile engine (not shown) for a purpose hereinafter described.
A piston 17 is slidably mounted in the cylinder 9 and is fastened to a flexible cord 18 which by means of pulleys 19 and 20 is led to the strip 7 and fastened to the latter by means of a bracket 21. The flexible cord 18 further extends over a pulley 22 located in a recess 23 of a cross-member 24, and further continues over pulleys 25 and 26 and is fastened to a piston 27. The latter piston is slidably mounted in the cylinder 10. It will be noted that if the piston 17 moves in one direction the piston 27 will move in the opposite direction.

The valve 11 is controlled by means of a rod 28 which projects through the cross-member 24 and is rotatably carried thereby. The valve 11 is so arranged as to operate both pistons 17 and 27 by the same movement of the rod 28.

The valve 11 has a valve casing 29 (see Figures 3 and 4), and the lower portion of the rod 28 is fashioned with a valve plug 30 which is rotatably mounted in a casing 29. The tube 12 is attached to a projection 31 of the valve 11. I provide a port 32 in the projection 31 and a port 33 in a projection 34. The tube 14 is attached to the latter projection connecting the valve 11 to the vacuum. Ports 35 and 36 are provided in the valve plug 30 and are so arranged as to provide a passage from the tube 12 to the tube 14 as shown in Figure 3, or to provide a passage from the tube 12 to the atmosphere through the port 37 if the valve plug 30 is rotated ninety degrees in a counter-clockwise direction.

I also provide projections 38 and 39 for attachment of the tubes 13 and 15 to the valve 11. The projections 38 and 39 have ports 40 and 41 respectively. Ports 42 and 43 in the valve plug 30 may connect the tube 13 either with the atmosphere by means of the port 44 in the valve casing 29 or with the tube 15 if the valve plug 30 is rotated ninety degrees in a counter-clockwise direction.

From the foregoing description of the various parts of the device, the operation thereof may be readily understood.

If the tube 12 is connected with the tube 14 (as shown in Figure 3), the piston 17 will move in a direction toward the valve 11 and will pull the flexible cord 18, which in turn will lower the member 3. The piston 27 will move in an opposite direction as previously explained. The ports 42, 43 and 44 provide a passage for the air into the cylinder 10, as shown in Figure 4.

If the rod 28 is rotated ninety degrees in a counter-clockwise direction, the ports 40,

41 and 42 connect the tube 13 with the tube 15 and the vacuum. The piston 27 then moves in a direction toward the valve 11 and the flexible cord 18 pulls the member 3 upward. The ports 32, 35, 36 and 37 provide a passage for the air into the cylinder 9.

The member 3 is locked in raised position. The rod 28 has a recess 45. A spring bracket 46 of the form shown in Figure 5 is located in a recess 47 of the cross-member 24 and has a lip 48 extending under the cross-member. In order to raise the member 3, the rod 28 has to be turned ninety degrees in a counter-clockwise direction from the position shown in Figures 1, 3, 4 and 5. After the member 3 is raised, further rotation of the rod 28 closes the valve 11 and at the same time presses the spring bracket and moves the lip 48 under the strip 7 for supporting the member 3.

Projections 49 and 50 are provided for the lowermost position of the member 3. The speed of the upward and downward movement of the member 3 can be regulated by the valve 11.

Means for taking up slack in the cord 18 is provided and consists of an eyelet 51 that slidably receives the portion of the cord extending from the bracket 21 to the piston 17, and a second eyelet 52 that slidably receives the portion of the cord extending from the bracket 21 to the piston 27. Springs 53 and 54 extend from the eyelets or rings 51 and 52 respectively to the door frame 1, and act upon the cord 18 to take up any slack and thus prevent kinking. This construction permits the manual raising and lowering of the window without interfering with the vacuum mechanism.

It should be noted that only one valve rod 28 with its handle need be provided for all operations. A rotation of the rod 28 through 90 degrees places one cylinder in communication with the vacuum and the other with the air. A movement of the rod in the opposite direction reverses the connections of the cylinders with the vacuum and atmosphere. A movement of the rod 28 through 45 degrees cuts both cylinders off from the air and vacuum and the window is held in any desired position, by this means.

Although I have shown and described one embodiment of my invention, it is to be understood that the same is susceptible of various changes, and I reserve the right to employ such changes as may come within the scope of the invention as claimed.

I claim:

1. In combination, a door having a movable window pane, guides therefor, a horizontally disposed cylinder mounted in the door, a piston mounted therein, means connecting the piston with the window pane for moving the latter when the piston is moved, and a valve for connecting the cylinder with a source of vacuum, whereby the piston is moved.

2. In combination, an automobile body having a pair of guides, a window pane slidable therein, a horizontally disposed cylinder mounted in the body, a piston, connections between the piston and the window pane for moving the latter when the piston is moved, and means for connecting one end of the cylinder with a source of vacuum, the other end of the cylinder being open to the atmosphere and permitting air to enter the cylinder and move the piston.

3. In combination, an automobile body having a movable window pane, a pair of horizontally disposed cylinders mounted in the body, a piston for each cylinder, means connecting each piston with the window pane for causing the latter to move in one direction when one piston is actuated and in the opposite direction when the other piston is actuated, and selective means for placing either of said cylinders in communication with a source of vacuum.

4. In combination, a door having a pair of guides, a window pane slidable therein, a horizontally disposed cylinder mounted in the door, a piston, connections between the piston and the pane for moving the latter, a second horizontally disposed cylinder mounted in the door, a second piston, connections between the second piston and the pane for moving the latter in an opposite direction, a common valve for both cylinders and being swingable for selectively placing either of said cylinders in communication with a source of vacuum and the other cylinder in communication with the atmosphere.

5. The combination with a door having a slidable window pane therein, of two cylinders horizontally disposed in said door and beneath the pane, a piston mounted in one of the cylinders and connections between the piston and the window pane for moving the latter in one direction, a piston mounted in the other cylinder and connections between it and the window pane for moving the pane in the opposite direction, and selective means for placing either of said cylinders in communication with a source of vacuum.

6. The combination with an automobile door and a slidable window pane, of a pair of cylinders carried by the door and disposed beneath the pane, a piston mounted in each cylinder and being connected to the window pane for raising and lowering it, a valve common to both cylinders for selectively placing them in communication with a source of vacuum, a handle for the valve, a catch for locking the window pane in closed position, said handle when swung for opening the window releasing the lock.

7. The combination with an automobile door having a window pane movable from closed position into a recess in the bottom of the door and vice versa, of a pair of cylinders disposed in a horizontal position and at the bottom of the door, pistons mounted in each, connections between the pane and one piston for moving the pane into open position, connections between the pane and the other piston for moving the pane into closed position, valves for placing either of the cylinders in communication with the source of air intake supply for the automobile engine, and a common handle for each valve.

8. The combination with an automobile door having a window pane movable from closed position into a recess in the bottom of the door and vice versa, of a pair of cylinders disposed in a horizontal position and at the bottom of the door, pistons mounted in each, connections between the pane and one piston for moving the pane into open position, connections between the pane and the other piston for moving the pane into closed position, valves for placing either of the cylinders in communication with the source of air intake supply for the automobile engine, a common handle for each valve, and a catch for locking the window pane in closed position, said handle when swung for opening the window releasing the catch.

ROYDEN BIRRELL.